Mar. 13, 1923.

H. ANDRIX

NUT LOCK

Filed Mar. 26, 1921

1,448,178

Inventor
Harry Andrix,
By
Attorneys

Patented Mar. 13, 1923.                                                     1,448,178

UNITED STATES PATENT OFFICE.

HARRY ANDRIX, OF ADRIAN, MICHIGAN.

NUT LOCK.

Application filed March 26, 1921. Serial No. 455,721.

*To all whom it may concern:*

Be it known that I, HARRY ANDRIX, a citizen of the United States of America, residing at Adrian, in the county of Lenawee and State of Michigan, have invented certain new and useful Improvements in Nut Locks, of which the following is a specification, reference being had therein to the accompanying drawings.

This invention relates to locking devices for retaining members and more particularly to means for locking screw-threaded members against relative rotation.

An object of the invention is to provide simple and efficient means for the purpose which is cheap to manufacture and easy to apply. A further object is to so construct such a device as to obviate accidental displacement and at the same time provide for the ready removal of the device when desired.

It is also an object to provide certain other new and useful features in the construction and arrangement of parts all as hereinafter more fully described.

With the above and other ends in view, the invention consists in the matters hereinafter set forth, and more particularly pointed out in the appended claims, reference being had to the accompanying drawing, in which—

Figure 1:
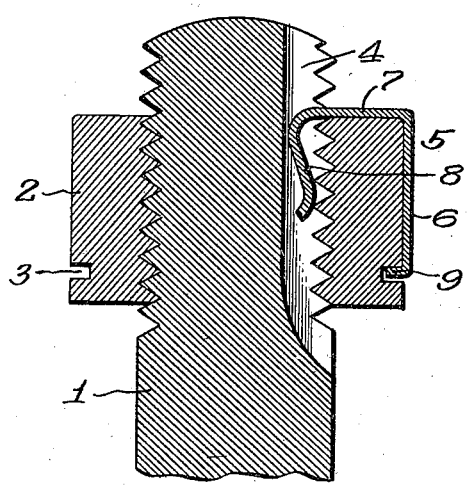
Figure 3:
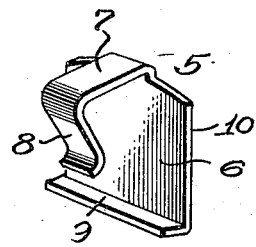
Figure 2:
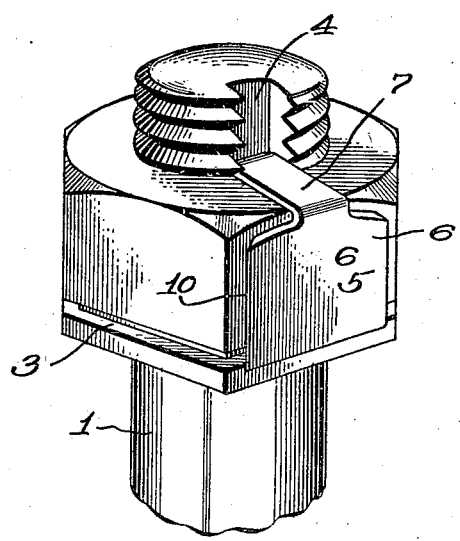

Figure 1 is a longitudinal section through an end portion of a bolt and a nut in place thereon, with a locking device illustrative of the invention applied thereto, Fig. 2 is a perspective view of the same, and Fig. 3 is a perspective view of a locking device detached.

As indicated in the drawing, 1 is the screw-threaded end portion of a bolt, rod or the like, to which a nut 2 is applied. This nut is of the usual hexagonal form but is provided with a peripheral groove 3 adjacent its base or inner end and the bolt 1 is formed with a longitudinal slot 4 in one side.

When the nut is in place upon the bolt and it is desired to prevent its further turning in either direction, a locking device, indicated as a whole at 5, is applied to the nut, said device being formed of sheet metal with a plate or body portion 6 adapted to lie flat against one of the facets of the nut and extending laterally inward from the upper edge of this plate is a spring tongue 7, said tongue extending inwardly across the outer end face of the nut and into the slot 4. Within the slot the tongue is formed with a curved spring portion 8 extending longitudinally of the slot and into the nut, said spring finger 8 being so arranged relative to the plate 6 that the normal distance between its yielding free end and the plate will be less than the thickness of the wall of the nut, that is, the thickness of the nut between its facet and the points of its screw-thread within its axial opening. The plate 6 is also formed with an inturned edge portion 9 to engage within the slot 3 of the nut, and the side edges 10 of the plate are preferably beveled or otherwise formed so that a suitable instrument may be forced beneath the plate to spring the plate away from the nut and pry this inturned flange 9 out of its groove, thus releasing the locking device from the nut.

In applying the locking device to the nut, the spring tongue, when it is entered into the slot of the bolt, will spring sufficiently to allow the plate to slip endwise across the facet of the nut until its lower inturned edge snaps into the groove in the nut. The locking device will thus be locked to the nut so that it cannot be accidentally displaced in use. When it is desired to unscrew the nut, the locking device may be quickly taken off by inserting a suitable tool underneath the plate to spring it away from the facet of the nut and thus release it from engagement with the groove 3, when it may be slipped endwise from the nut and removed.

The spring tongue exerts a force when the locking device is in place upon the nut to clamp the body of the nut between it and the plate 6 and thus the inturned edge 9 of the plate is firmly held in engagement with its groove and no amount of jarring will cause the locking device to become loose. The plate is of a width to cover a major portion of the facet of the nut and the inturned edge 9 thereon extends the full width of the plate so that this plate has a wide bearing against the facet and the locking edge has a wide bearing in the groove, thus preventing any tilting of the device and holding the tongue firmly in place within the groove 4 so that it will be impossible to turn the nut without first removing the locking device.

As the locking device is formed from sheet metal, it may be very cheaply and expeditiously manufactured, the operation of manufacture being simply a stamping operation and by selecting the proper steel and giving it the proper tempering, the locking device will, under all conditions, clamp itself firmly to the nut and be held thereby in position to prevent the nut from turning upon the bolt.

Obviously changes may be made in the size or proportion of parts and in the details of construction and arrangement, within the scope of the appended claims and I do not therefore limit myself to the particular form or arrangement shown.

Having thus fully described my invention, what I claim is:—

1. The combination with a threaded element having a longitudinal groove and a threaded nut mounted on the threaded portion of the element, and having a circumferential groove adjacent the base of the nut, of a locking device formed of sheet metal with a body portion to lie flat against a facet of the nut, and having an inturned edge to engage within said groove in the nut, said body being also formed with an integral laterally extending tongue provided with a yieldable end portion extending into the groove in the threaded element and longitudinally thereof within the bore of the nut, said yieldable end portion of the tongue being arranged to yieldably engage the wall of the bore of the nut and hold the body of the locking device in contact with the facet of the nut with the inturned edge of the body in engagement with the slot.

2. The combination with an element having threads and having a longitudinal groove interrupting the threads, and a threaded nut having flat exterior facets and mounted on the threaded element, said nut having a circumferential groove, of a locking device comprising a body to lie flat upon a facet of the nut and having an inturned edge to engage within said groove in the nut, said body having a spring tongue to extend across and in contact with the outer end face of the nut, the tongue having a resilient end portion to lie wholly within the groove in the threaded element and to bear upon the threads of the nut to hold the body of the device yieldingly in contact with the facet of the nut.

In testimony whereof I affix my signature in presence of two witnesses.

HARRY ANDRIX.

Witnesses:
LEWIS E. FLANDERS,
ANNA M. DORR.